United States Patent [19]

Kobayashi

[11] 4,374,614
[45] Feb. 22, 1983

[54] MECHANISM FOR LOADING FILM BACK IN OR UNLOADING SAME FROM CAMERA BODY

[75] Inventor: Takumi Kobayashi, Tokyo, Japan

[73] Assignee: Asahi Kogaku Kogyo Kabushiki Kaisha, Tokyo, Japan

[21] Appl. No.: 316,372

[22] Filed: Oct. 29, 1981

[30] Foreign Application Priority Data

Oct. 30, 1980 [JP] Japan ............................ 55-155386[U]

[51] Int. Cl.³ .............................................. G03B 1/00
[52] U.S. Cl. .................................................. 354/216
[58] Field of Search ............... 354/212, 213, 214, 215, 354/216, 275

[56] References Cited

U.S. PATENT DOCUMENTS 4,232,957 11/1980 Kovacs ................................ 354/275
4,274,728 6/1981 Waaske ................................ 354/275

Primary Examiner—L. T. Hix
Assistant Examiner—Alan Mathews
Attorney, Agent, or Firm—Sughrue, Mion, Zinn, Macpeak and Seas

[57] ABSTRACT

A plate slidable on a film back has a hook which abuts a pin on a camera body as the film back is inserted. The hook is forced to slide as the film back is inserted and pulls a locking pawl on the film spool gear out of engagement until inserting is completed at which time the hook snaps back and locks the film back into the camera.

11 Claims, 3 Drawing Figures

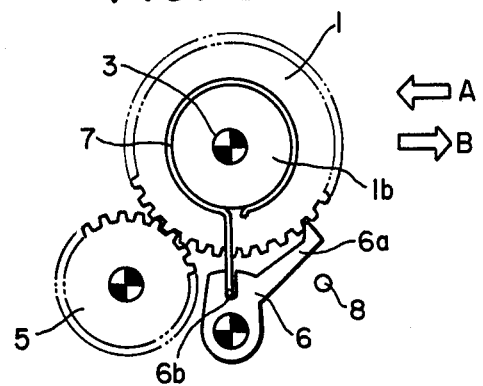
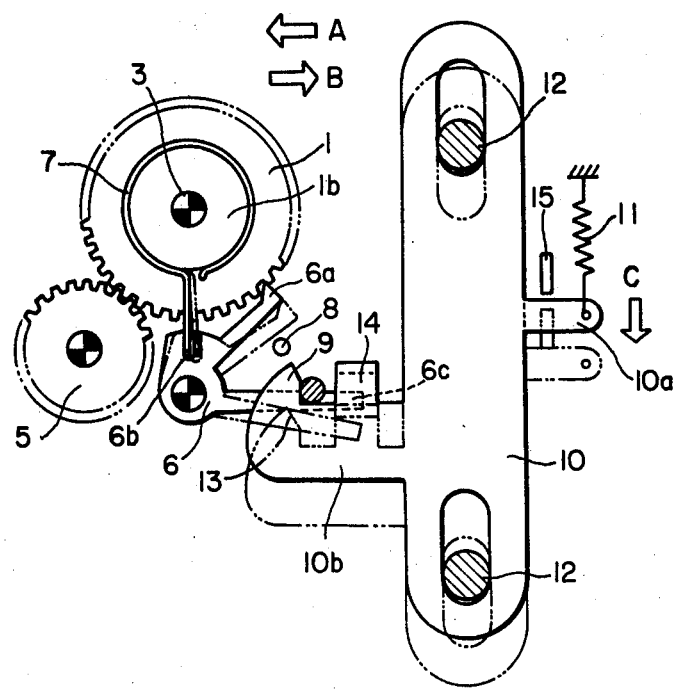

MECHANISM FOR LOADING FILM BACK IN OR UNLOADING SAME FROM CAMERA BODY

BACKGROUND OF THE INVENTION

This invention relates to a mechanism for loading a film back in or unloading it from a camera body.

When a conventional film back is loaded into a camera body, a gear operated in association with the winding mechanism in the camera body is engaged with the spool gear which is fixedly mounted on the spool shaft of the film back, so that the winding force can be transmitted from the camera body to the film back to wind the film on the spool. In many cases, the spool gear is so designed that it is allowed to turn in one direction only, in order to prevent the film wound on the spool from being slackened.

FIGS. 1 and 2 show one example of a conventional mechanism adapted to cause the aforementioned spool gear to turn in one direction only. The spool gear 1 is provided on one side of a film back 2 and is fixedly secured to one end of a spool shaft 3 which is rotatably supported by both sides of the film back 2. When the film back 2 is loaded in a camera body 4 (by being moved in the direction of the arrow A), the spool gear 1 is engaged with a gear 5 which is operated in association with the winding drive mechanism of the camera. A ratchet member 6 permitting the spool gear 1 to turn in one direction only is rotatably supported by the side of the film back 2. The ratchet member 6 has a pawl 6a and an elongated slot 6b. The pawl 6a is engaged with a tooth of the spool gear 1. One end of a spring 7 which is wound on a small-diameter portion 1b of the spool gear 1 is inserted into the elongated slot 6b so as to bias the pawl in the counterclockwise direction but permit the ratchet member 6 to intermittently operate. A stopper 8 is provided near the pawl 6a on the side of the film back 2 in order to limit the intermittent motion of the ratchet member 6. Therefore, the spool gear 1 shown in FIGS. 1 and 2 is allowed to turn counterclockwise only, and it is not allowed to turn clockwise by the pawl 6a.

However, the one-way-turn system of the spool gear described above suffers from several difficulties. Since the spool gear 1 is permitted to turn in one direction only as described above, when the film back 2 is loaded in the camera to allow the spool gear 1 to engage with the gear 5 on the camera, the spool gear 1 cannot be smoothly engaged with the gear 5 if a force acts on the spool gear 1 in the direction in which the rotation thereof is inhibited. Further, if the film back 2 is unloaded from the camera body 4 (by being moved in the direction of the arrow B), the spool gear 1 cannot be smoothly disengaged from the gear 5. Thus, it is difficult to smoothly load or unload the film back. Furthermore, for the same reasons, the feeling which the operator gets in winding the film may be unsatisfactory.

SUMMARY OF THE INVENTION

This invention is intended to eliminate the above-described difficulties. An object of the invention is to provide a mechanism for loading a film back in and unloading it from a camera body, which is simple in construction and can eliminate the aforementioned difficulties.

Briefly, in accordance with the present invention, the smooth insertion and removal of the film back is obtained by providing means for disengaging the pawl from the spool gear upon insertion or removal of the film back. The disengaging means essentially comprises a hook member having a bent portion as well as a sloped leading edge. Upon insertion of the film pack, the sloped edge abuts a pin on the camera body and is forced downwardly, simultaneously pulling the pawl away from the gear. Upon complete insertion, the hook snaps upwardly and allows the pawl to reengage the spool gear. For film back removal, the hook can be moved downwardly by an operating member.

BRIEF DESCRIPTION OF THE DRAWINGS

In the drawings:

FIG. 2 is a plan view showing the essential components of the mechanism in FIG. 1; and FIG. 3 is a plan view showing the essential components of a mechanism for loading a film back in or unloading it from a camera body according to this invention.

DETAILED DESCRIPTION OF THE INVENTION

Figure 1:
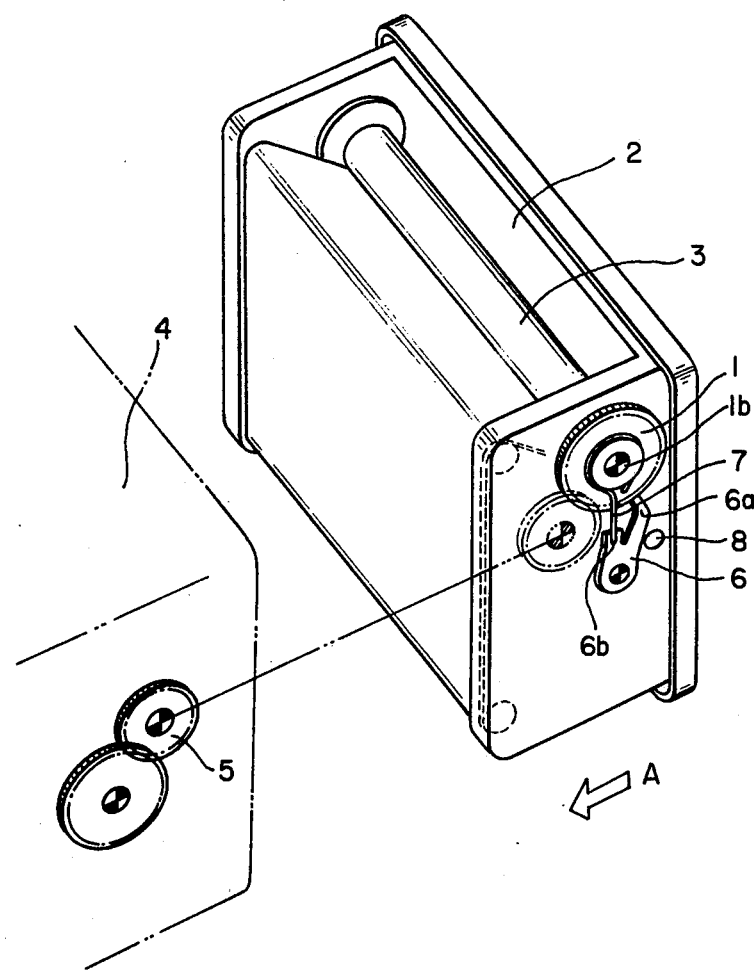
FIG. 1 is a perspective view showing one example of a conventional mechanism for loading a film back in or unloading it from a camera body.

One example of the mechanism according to this invention will now be described with reference to FIG. 3.

In FIG. 3, reference numeral 1 designates a spool gear; 1b, a cylindrical portion of the spool gear 1 which is smaller in diameter (hereinafter referred to as "a small-diameter portion"); 3, a spool shaft; 5, a gear on a camera, which is engaged with the spool gear 1; 6, a ratchet member; 6a, a pawl which engages with the teeth of the spool gear 1; 7, a spring wound on the small-diameter portion 1b of the spool gear and having one end connected to the ratchet member; and 8, a stopper for limiting the intermittent operation of the ratchet member 6. The operational relationships of these components are similar to those of the above-described conventional mechanism, and therefore their detailed descriptions will be omitted.

Further in FIG. 3, reference numeral 10 designates an elongated locking plate provided vertically on one side of a film back (not shown in FIG. 3). The locking plate 10 has two elongated holes cut in the upper and lower end portions. The locking plate 10 is supported on the side of the film back by engaging the elongated holes with two pins 12 provided on the side of the film back. The locking plate 10 is urged upwardly by a spring 11 which is elastically connected between the film back and a mounting piece 10a extended from the locking plate 10. The locking plate 10 has an engaging protrusion 10b which is extended from one side of the lower end portion of the locking plate 10. The engaging protrusion 10b has a hook 9 at the end. When the film back is loaded into the camera body, the hook 9 engages with a locking pin 13 provided on the camera body. The engaging protrusion 10b has a bent portion 14 at the middle, which is extended from one edge thereof. The bent portion 14 is normally confronted with an elongated swinging portion 6c which is extended from the ratchet member 6. When the film back is loaded in or unloaded from the camera body, the bent portion 14 is caused to push the swinging portion 6c to forcibly turn the ratchet member 6, so that the pawl 6a is disengaged from the spool gear 1. An unlocking member 15 is provided on the film back in such a manner that it confronts with the mounting piece 10a of the locking plate 10. In unloading the film back from the camera body, in association with an operating member (not shown) the unlocking member 15 pushes the locking plate 10 downwardly through the mounting piece 10a, to thereby disengage the hook 9 from the locking pin 13.

As the film back is moved in the direction of the arrow A in FIG. 3 in order to load the film back in the camera body, the hook 9 of the engaging protrusion 10b of the locking plate 10 abuts against the locking pin 13 on the camera body. When the film back is further moved, since the locking pin 13 is fixedly secured to the camera body, the locking plate 10 is gradually moved downwardly (in the direction of the arrow C) by being guided by the edge of the hook 9, which abuts against the locking pin 13. Immediately before the hook 9 is disengaged from the locking pin 13, the locking plate 10 is positioned as indicated by the phantom line in FIG. 3. When the hook 9 is disengaged from the locking pin 13, the locking plate 10 is restored by the elastic force of the spring 11, the locking pin 13 is engaged with the hook 9 as indicated by the solid line in FIG. 3, and the film back is locked to the camera body.

In this operation, the bent portion 14 is moved down with the locking plate 10 to abut against the swinging portion 6c of the ratchet member 6. The bent portion 14 turns the ratchet member 6 while pushing the swinging portion downwardly. Thus, immediately before the hook 9 is disengaged from the locking pin 13, the bent portion 14 causes the pawl 6a of the ratchet member 6 to disengage from the spool gear 1, as a result of which the spool gear 1 is allowed to turn in the opposite direction also. Therefore, in loading the film back in the camera body, the spool gear 1 can be smoothly engaged with the gear 5 on the camera body.

The same thing can be said for the case where the film pack is unloaded from the camera body. When the operating member (not shown) pushes the unlocking member 15 downwardly to lower the locking plate, the bent portion 14 lowers the swinging portion 6c of the ratchet member 6 to turn the latter 6. Thus, in unloading the film back, the pawl 6a if disengaged from the spool gear, and therefore the spool gear 1 is never caught by the gear 5 on the camera body.

While one embodiment of the invention has been described, it will be understood that the invention is not limited thereto or thereby. That is, any mechanism can be employed if it is so designed that, when a film back is loaded in or unloaded from a camera body, the pawl 6a of the ratchet member is disengaged from the spool gear 1 temporarily in association with a locking member (corresponding to the locking plate 10 in the above-described example).

According to this invention, merely by the operation of loading the film back in or unloading it from the camera body without performing any special operation, the limitation in rotation of the spool gear is released so that the spool gear can be engaged with or disengaged from the gear on the camera body. Thus, the film back can be smoothly loaded in or unloaded from the camera body, and the operability is improved. Furthermore, no excessive force is exerted on the gear, which increases its durability and improves the film winding characteristics. Thus, the advantages in practical use of this invention should be highly appreciated.

What is claimed is:

1. In a film back of the type having a film spool gear which, when said film back is inserted into a camera, will engage a winding gear in said camera, and one-way means for permitting rotation of said film spool gear in only one direction, the improvement comprising:
   disabling means for disabling said one-way means only during insertion or removal of said film back to permit rotation of said film spool gear in either direction during insertion of said film back into said camera or removal of said film pack from said camera.

2. A film back as claimed in claim 1, wherein said one-way means comprises a ratchet pawl biased into engagement with said film spool gear, said disabling means comprising means for pulling said ratchet pawl out of engagement with said spool gear during insertion or removal of said film back.

3. A film back as claimed in claim 2, wherein said pawl includes an elongated portion, said disabling means comprising:
   a slidable member mounted on said film back and having a bent portion for engaging said elongated portion when said film back is inserted, said slidable member having a sloped camming surface which cooperates with a portion of said camera to force said slidable member to slide with respect to said film back as said film back is inserted, whereby said bent portion pulls said elongated portion to disengage said pawl from said spool gear.

4. A film back as claimed in claim 3, wherein said slidable member slides in a direction substantially perpendicular to the moving direction of said film back when said film back is inserted.

5. A film back as claimed in claim 3, wherein said slidable member comprises a hook member having a camming surface on a forward end thereof, said forward end of said hook member being forced by a cooperating part of said camera in a direction substantially perpendicular to the direction of movement of said film back as said film back is inserted, said hook member passing around said cooperating part during insertion of said film back, and biasing means for biasing said hook member in a direction opposite said substantially perpendicular direction whereby said hook member locks said film back into said camera via engagement with said cooperating part.

6. A film back as claimed in claim 4, further comprising biasing means for biasing said slidable member in a direction opposite said substantially perpendicular direction to lock said film back into said camera via engagement of said slidable member and cooperating portion when said film back is substantially fully inserted, and means for sliding said slidable member to disengage said slidable member and cooperating portion for removal of said film back.

7. A film back loading and unloading mechanism, for loading a film back into or unloading said film back from a camera, said film back having a film spool gear and one way means biased into engagement with said gear for permitting rotation in only one direction, said mechanism comprising:
   movable means on one of said film back and camera, said movable means having an engaging portion for engaging said one-way means as said film back is inserted into said camera; and
   fixed means on the other of said film back and camera for engaging said movable means as said film back is inserted, said fixed means forcing said movable means to move in a first direction and thereby pull said one-way means out of engagement with said gear.

8. A mechanism as claimed in claim 7, wherein said movable means is biased in a direction opposite to said first direction, said movable means moving in said opposite direction when said film back is substantially fully inserted to thereby allow said one-way means to re-engage said spool gear.

9. A mechanism as claimed in claim 8, wherein said movable means locks said film back into said camera upon movement in said opposite direction at the end of film back insertion.

10. A mechanism as claimed in claim 9, wherein said movable means includes a hook member having an inclined leading edge which abuts said fixed means as said film back is inserted, said hook member locking onto said fixed means when said movable means moves in said opposite direction at the end of film back insertion.

11. A mechanism as claimed in any one of claims 7-10, wherein said movable means is mounted on said film back.

* * * * *